UNITED STATES PATENT OFFICE 2,159,952

FOUNDRY SAND

Otis L. Jones, Joliet, and Jesse L. Essex, La Grange, Ill., assignors to The Illinois Clay Products Company, Joliet, Ill., a corporation of Illinois No Drawing. Application July 19, 1937, Serial No. 154,466

4 Claims. (Cl. 22—188)

This invention relates to foundry sands and among other objects aims to improve the qualities and methods of tempering of foundry sands.

The nature of the invention may be readily understood by reference to one illustrative material embodying the invention and described in the following specification.

Molding or green bond sands generally contain a bonding material in the form of a clay-like substance which in moist condition serves to bond the grains of said together while maintaining the pervious condition necessary for the escape of gases, etc. In so-called natural molding sands, the bonding material (about 30% of combined clay and silt) is naturally present. In synthetic molding sands, it is added to ordinary unbonded sands. Because of their superior bonding qualities, highly colloidal clays such as bentonite and beidellite are used in synthetic molding sands, thereby greatly reducing the amount (from 4 to 10%) used and improving the porosity of the sand and securing other well-known advantages.

In addition, a small amount of sea coal (i. e. a finely pulverized soft coal) is added to the sand to prevent burning of the sand on the casting and to improve the surface of the casting. The sea coal functions both to create a cushion or blanket of gases adjacent the hot metal and to leave a carbon deposit on the face of the mold.

Reduction in the rate of moisture loss is of great advantage since it insures proper bond strength at the time of casting despite the lapse of time since tempering the sand. For example, ordinary synthetic molding sand, although it requires only about 50% of the tempering water necessary for natural molding sand, loses from 50 to 60% of its tempering moisture when left exposed for several hours. This obviously greatly weakens the bond and substantially increases the likelihood of an imperfect casting.

For the foregoing and other reasons, it is highly desirable not only to maintain a constant moisture content but to retard loss of moisture. Synthetic molding sands bonded with beidellite require even less tempering water than those bonded with bentonite, despite the fact that a higher per cent of beidellite (6 per cent as against 4 per cent) must be used to secure the same bonding strength.

We have discovered that reduction in the amount of tempering moisture and retardation of loss of moisture may be effected by the use of an oil-in-water emulsion and that sea coal and its attendant difficulties may be avoided by employing an emulsion of an oil or oily substance having a high carbon content, such as asphalt, road oil, cracked residuum, coal tars, and the like.

By decreasing the surface tension of the water film surrounding the grains of sand and particles of bonding clay, it is possible greatly to retard the loss of moisture. Indeed the rate of moisture loss seems to be roughly proportional to the surface tension of the water film. The use of an oil-in-water emulsion not only reduces the surface tension of the water film but greatly aids in the ability to wet the surfaces of the sand grains and clay particles. The particles of oil appear to increase the bonding power between the water film and the sand grains and clay particles, thereby retarding subsequent evaporation. The particles of oil in the emulsion seem not only to supplement the bonding function of the water film but to cause the water film to function with maximum effect. The oil particles also apparently cooperate in eliminating the film of air around the grains of sand and clay particles which interfere with maximum bonding effect. Whereas water tempered molding sand will lose from 50 to 60% of its moisture in a few hours, sand tempered with the aforesaid emulsion will lose only about 25% or less of its moisture after an exposure for three days. In normal operation, where the sand is exposed for a few hours from the time of tempering to the time of use, there is no noticeable loss of moisture in emulsion tempered sand.

In making an emulsion of this character, any oily substance which is insoluble in water is dispersed in water to form an oil-in-water emulsion. Two types of emulsifying agents may be employed: triethanolamine with oleic and/or stearic acids; or, a highly colloidal clay such as bentonite or beidellite.

The following emulsions are illustrative:

| Material emulsified | Parts by weight ||||| 
|---|---|---|---|---|---|
| | Oily material | Oleic acid | Clay | Triethanolamine | Water |
| Kerosene | 89 | 8 | | 3 | 100 |
| Light fuel oil | 89 | 8 | | 3 | 100 |
| Asphalt | 87 | 9 (stearic acid) | | 4 | 400 |
| Do | 60 | | 2 | | 40 |

In preparing the foregoing emulsions, the kerosene, light fuel oil or asphalt are mixed in one container with the oleic (or stearic) acid and the water and triethanolamine are mixed in another container. After the latter ingredients are thoroughly mixed, the oil-oleic acid mixture is added and vigorous agitation maintained until a stable emulsion results. When clay is used as an emulsifying agent, the asphalt, road oil, heavy fuel oil, coal tar, etc., are added in warm condition (175° F. or less) to a slurry formed of the clay and water and agitation maintained until a stable emulsion results. Unless additional water is necessary in a given case the emulsion may be used in the creamy consistency in which it is prepared. Preferably the water content should be adjusted by adding water to the emulsion.

As stated above, emulsions of asphalt and other oily substances containing a high percentage of available hydro-carbon may also serve to supplant sea coal. In such cases the asphalt or its equivalent will decompose to provide cushioning or blanketing gases and to leave a residue of carbon on the surface of the mold, thereby preventing the burning of sand on the casting and improving the surface of the casting. The carbon in the asphalt practically entirely resides in volatile constituents and therefore may be used in much smaller amount than sea coal to serve the same purpose. Unlike sea coal, it leaves no residue to clog the pores in the mold to impair the quality of the sand for re-use.

In reconditioning the sand with asphalt-water emulsion, the additional asphalt replaces that burned away in the mold. Thus the process of retempering the sand eliminates the further operation heretofore necessary, of adding other sea coal to replace that burned away in the mold.

Obviously, the invention is not limited to the details of the illustrative construction since these may be variously modified. Moreover, it is not indispensable that all features of the invention be used conjointly, since various features may be used in different combinations and sub-combinations.

Having described our invention, we claim:

1. The method of green sand molding which is characterized by forming a carbon deposit on the surface of the mold by incorporating in the molding sand a small amount of fluid hydrocarbon, such as emulsified asphalt, having a high carbon content and low residue; and causing said asphalt to decompose under the action of heat as the metal is poured into the mold to evolve blanketing gases and to leave a carbon residue on the surface of the mold without clogging the pores in the sand.

2. The method of providing carbon bearing cushioning gases in green sand molding without clogging the pores in the sand which is characterized by incorporating in the sand a small amount of material having a high carbon content, such as asphalt, and effecting uniform distribution of such small amount throughout the sand by adding it thereto in emulsion form; said asphalt being adapted to decompose under the heat of the metal as it is poured into the mold to evolve blanketing gases and to leave a carbon deposit on the surface of the mold without clogging the pores in the sand.

3. The method of distributing a small amount of carbon bearing material in green molding sand which is characterized by employing asphalt or other high carbon content oils in a water emulsion and increasing the bulk of the fluid to effect a uniform distribution by employing sufficient water to temper the sand, said asphalt being adapted to decompose without leaving a substantial residue to clog the pores of the sand to provide cushioning gases and a carbon deposit on the surface of the mold.

4. The method of incorporating carboniferous material in sand for green sand molding which is characterized by distributing a relatively small amount of material having a high carbon content and low residue, such as asphalt, in the sand by the use of an asphalt in water emulsion; and employing sufficient water in the emulsion to temper the sand thereby to effect uniform distribution of the asphalt throughout the sand; said asphalt being adapted to decompose under the heat of the metal to evolve cushioning gases to provide a carbon deposit on the surface of the mold without substantially clogging the pores of the sand.

OTIS L. JONES.
JESSE L. ESSEX.